Jan. 11, 1966  E. M. FARRELL  3,228,120
EDUCATIONAL DEVICE
Filed Aug. 18, 1961  2 Sheets-Sheet 1

INVENTOR.
EDWARD M. FARRELL

INVENTOR.
EDWARD M. FARRELL

United States Patent Office 3,228,120
Patented Jan. 11, 1966

3,228,120
EDUCATIONAL DEVICE
Edward M. Farrell, Westmont, N.J., assignor to Holland Electronics Inc., a corporation of New York
Filed Aug. 18, 1961, Ser. No. 132,460
5 Claims. (Cl. 35—14)

This invention relates to Morse code devices, and more particularly to Morse code devices for teaching a person to both send and receive Morse code.

Over the years, the Morse code has continued to find wide applications in the field of radio communications. Among the reasons for this is that it has been universally accepted as an efficient means of communicating messages, is difficult to "jam," and is generally reliable under the most adverse weather and atmospheric conditions.

Knowledge of the Morse code has continued to be a requirement for those entering into the field of amateur radio. In addition, boy scout and civil defense organizations make extensive use of the Morse code. The Armed Forces spend many months in training personnel in the use of the Morse code.

Various devices for teaching the Morse code have been marketed. In the main, these devices have included such things as audio oscillators which may be keyed in a conventional manner to produce audible signals. Also records adapted to be played on a phonograph have been used for transmitting the Morse code. Simple type battery operated buzzers, suitably coupled to a telegraph key, have also been used extensively to provide a simple and inexpensive device to assist a person in learning to transmit the Morse code.

In most commercially available equipment, a person who wishes to learn to both transmit and receive the Morse code without the help of other persons, must generally buy two separate pieces of equipment. For example, he must buy both an audio oscillator with a key to practice sending the code as well as a phonograph record to practice receiving the code. While some government equipment have involved paper tape devices within a single unit for practicing both sending and receiving the Morse code, for the most part, such units have been generally very cumbersome and expensive. Generally, such latter devices have not been available or commercially practical for individuals, such as boy scouts, who might be interested in learning to send and receive the Morse code.

It is an object of this invention to provide a novel Morse code device which includes means for automatically transmitting the Morse code.

It is a further object of this invention to provide a novel completely self contained Morse code device for automatically transmitting and for manually producing audible Morse code signals.

It is still a further object of this invention to provide a novel Morse code device capable of automatically transmitting the Morse code in random order.

It is still a further object of this invention to provide a novel Morse code device in which the Morse code characters are arranged into groups for automatic transmission to facilitate the learning of the Morse code during transmission.

It is still a further object of this invention to provide a novel portable Morse code device which permits both automatic and manual production of audible Morse code signals.

It is still a further object of this invention to provide a novel Morse code device in which the Morse code may be automatically transmitted in a random order at variable speeds.

It is still a further object of this invention to provide a novel Morse code device for both automatically transmitting and manually producing audible Morse code signals, which may be manufactured relatively cheaply and with standard non-complicated components.

In accordance with the present invention, a Morse code teaching device which permits both automatic transmission and manual keying includes a code carrying member adapted to be moved by a motor or other suitable means. The member may include a plurality of contacts or elements dimensioned to correspond to either a "dot" or a "dash" of the Morse code. The contacts are arranged in suitable groups to correspond to characters of the Morse code, which may include letters of the alphabet and numbers. All of the characters are subdivided into relatively small groups and arranged in random fashion. Suitable means, such as brush members, are associated with the contacts to produce audible signals. Selector means are employed to select particular groups of characters to be audibly produced. By suitable selection, a learner may learn to receive one group of Morse code characters at a time and proceed from group to group until he has mastered the entire alphabet and numbers. A manual key is provided to produce audible sounds to enable a person to learn to send the Morse code.

Other objects and advantages of the present invention will be apparent and suggest themselves to those skilled in the art, from a reading of the following specifications and claims, in conjunction with the accompanying drawing, in which:

In one form of the present invention, which has been built and proven acceptable, the entire 26 letters of the alphabet and 10 numbers were divided into six groups, with each group comprising six characters. The invention was designed to automatically transmit one group of six characters over and over in random fashion until the six characters in the group are learned by a trainee. After one group was learned, a second group was selected to be automatically transmitted. This procedure was followed until all six groups including the entire 36 characters were learned. At this point, selective means for automatically transmitting the entire alphabet were provided. A manual key was also provided to enable a trainee to practice sending the Morse code.

Figure 1:
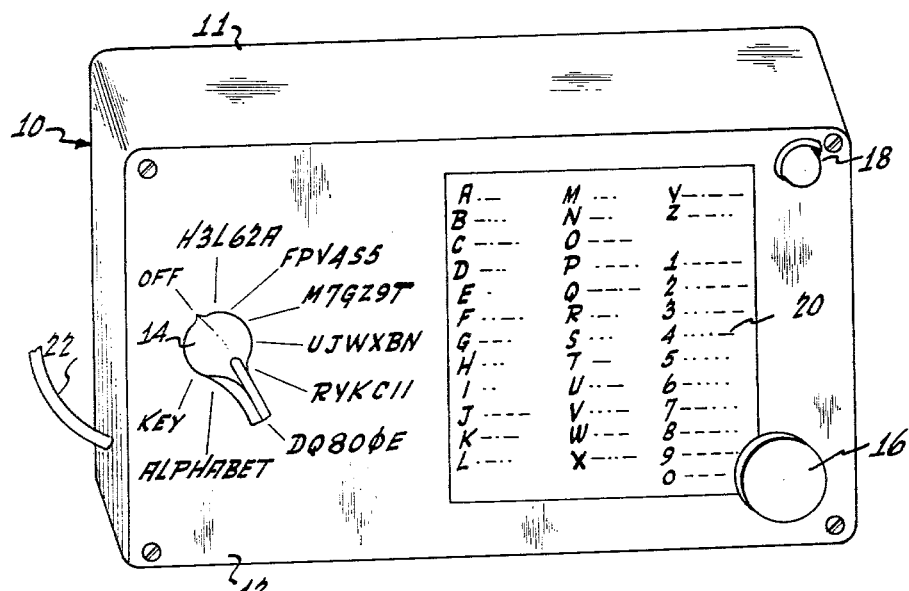
FIGURE 1 is a perspective view of a Morse code teaching device, in accordance with the present invention.

Referring particularly to FIGURE 1, a Morse code device 10 includes a case 11 including a frontpiece 12 suitably mounted thereto by screws or other means. The frontpiece 12 includes a selector knob 14 to actuate a selector switch, as will be described. The selector knob may be switched from an "off" position to any one of eight other positions. Six positions are used to permit automatic transmission of audible signals of six different character groups. One position, labeled "alphabet," is used to permit automatic transmission of the entire alphabet. A final position, labeled "key" is used to permit manual keying when a key or button 16 is manually depressed. A visual indicator 18 is provided to produce a flashing light to accompany the audible sound during the automatic or manual production of the Morse code signals. The frontpiece 12 includes a label 20 which include letters and numbers representing the entire alphabet and numbers, together with their corresponding More code indications. A line cord 22 is provided to be connected to a suitable source of operating power, such as 110 volts, alternating current.

When the code device 10 is connected to an appropriate source of power and the selector knob is switched from the "off" to the first position, the selector knob will be pointing to the first group of characters, designated H3L62A. Through means, to be described, audible signals, representing the characters of this first group, are automatically produced. The characters in this group are transmitted over and over in pre-arranged sequences with the order of each sequence being different for each successive transmission. In the particular embodiment illustrated, the characters in the group are transmitted in four different random orders for each cycle of operation, with each cycle being repeated indefinitely. The number of random transmissions may be more or less than four dependent upon the particular design.

For convenience in learning Morse code, in the embodiment of FIGURE 1, the first time that a group of characters is transmitted, they will be in the same order as the order or sequence of characters noted on the frontpiece 12 to which the knob 14 is pointing. After the first transmission of the first grouping of characters, as determined by a relatively long pause between complete cycles of transmission, the order in which the characters in the group is transmitted will be different for four successive transmissions. After four transmissions, the entire cycle of operation is repeated indefinitely, in a manner to be described.

During operation of the Morse code device 10, which may be used in conjunction with a planned systematic Morse code course, the knob 14 may be switched from position to position to cause different groups of characters to be automatically transmitted. On the second position away from the "off" position, for example, a second group may comprise the characters FPV4S5; on the third position, the group includes the characters M7GZ9T and so on through six groups with each group comprising the characters as indicated on the frontpiece 12. Finally, a position labelled "alphabet" is provided for automatic transmission of the entire alphabet, preferably in random order. This latter "alphabet" position is provided to permit a learner to test his receiving ability after the previous six groups of characters have been learned. A final position designated "key" is provided. When the selector knob 14 is pointed to the "key" position, the key 16 may be employed to permit a learner to manually send audio Morse code signals.

Figure 2:
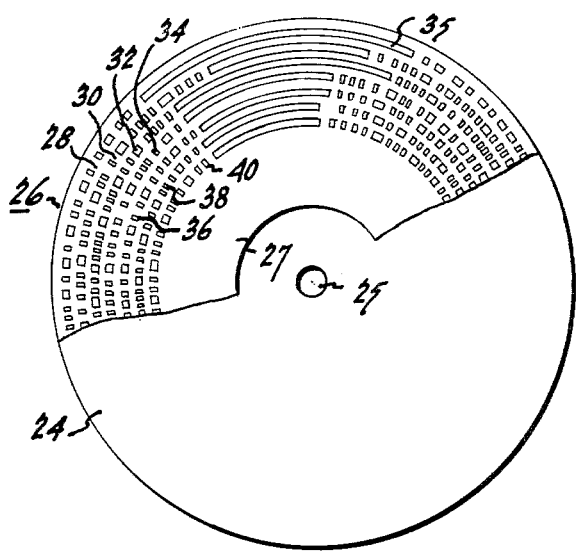
FIGURE 2 is a front view of a contact bearing member, which may be employed in the present invention.

In one embodiment of the present invention, a plate member having a plurality of electrical contacts is used as part of a switching means to open and close an electrical circuit to actuate an audible sound producing device. One such type plate member is illustrated in FIGURE 2, wherein a plate member 24 includes a plurality of contacts 26. The plate member 24 may be of various different forms. One preferred form, for example, may be a circular printed circuit plate in which various conductive metallic contacts are suitably bonded to an insulated material. The plate member 24 may also be a metallic plate suitably punched to provide conductive and nonconductive portions of the desired widths. The shape of the plate may also be other than the circular. The plate 24 has an aperture 25 to permit it to be suitably adapted to be connected to the shaft of a motor by a press fit, by screw means engaging a threaded shaft or by other suitable means. The plate 24 is adapted to be rotated at some predetermined speed, dependent upon the rate at which it is desired to transmit the code.

In the embodiment illustrated, the plate 24 includes a plurality of concentric rings of contacts, such as the ring of contacts 28, 30, 32, 34, 36, 38 and 40. The ring of contacts 26 may include contacts dimensioned to represent the first group of Morse code characters H3L62A; the ring of contacts 30, the second group FPV4S5 and so on with the contacts 32, 34, 36 and 38 representing the third, fourth, fifth and sixth groups, respectively. The ring of contacts 40 may represent the entire alphabet.

The rings of contacts may be made of conductive material, such as copper. The portions between the rings of contacts are also conductive. A central portion 27 is also made of copper and, in the embodiment to be described, forms a common return for all the contacts included in the rings of contacts. Thus, for example, if a brush engages one of the conductive contacts of the ring 28 and a second brush engages the portion 27, the plate 24 may be considered as a switching device to close a circuit. When the brush engages the insulated portion of the plate between contacts, the circuit across which the brushes are connected will be open.

It is noted that all of the rings of contacts have a relatively wide insulated portion, such as the insulated portion 35, for example. This relatively wide spacing is provided for determining the start of each cycle of Morse code transmission, during operation. As has been mentioned, the first time that the Morse code is automatically transmitted may be in the same order as that noted on the frontpiece 12 (FIGURE 1). This feature assists the beginner in learning the Morse code.

Figure 3:
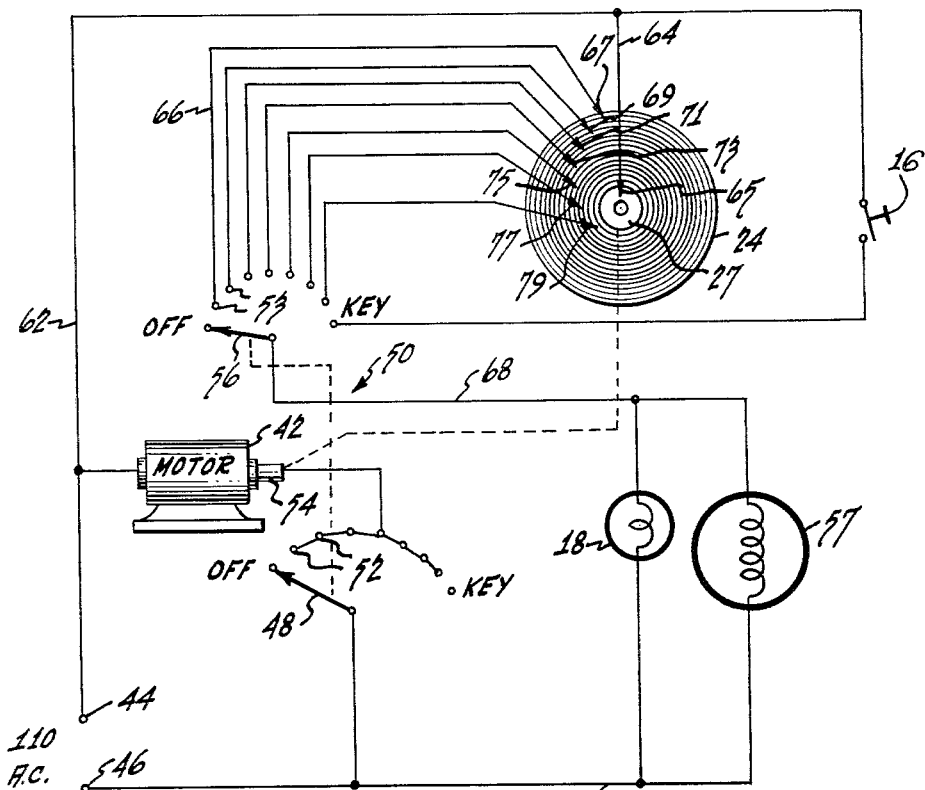
FIGURE 3 is a form of schematic diagram illustrating the electrical circuit, in accordance with the present invention.

Referring particularly to FIGURE 3, a motor 42 is actuated by a source of alternating power through a pair of terminals 44 and 46. The movable arms 48 and 56 of a two section selector switch 50 are ganged together and adapted to be moved from the contact designated "off" to any one of the next seven contacts 52 and 53 of the two section switch. All the contacts 52 are electrically connected together. When the arm 48 engages any one of the contacts 52, current flows from the terminal 44, through the motor 42, through one of the contacts 52, through the movable arm 48 and back to the terminal 46. This causes the motor 42 to be rotated at some predetermined speed, such as one revolution per minute. The shaft 54 of the motor is mechanically connected to rotate the plate 24 in accordance with the rotation of the motor. When the arm 48 is moved to the contact designated "key" the current path is broken and the motor 42 becomes inoperative. The arm 56 of the upper section of the selector switch 50 is selectively moved with the arm 48 when the selector knob 14 (FIGURE 1) is moved.

Consider the operation when the selector switch 50 is actuated to cause the arms 48 and 56 to be moved from the "off" contacts to the first contact. In this case, the motor is actuated in a manner described above and the arm 56 electrically engages one of the contacts 53. When the arm 56 engages one of the contacts 53, current flows from the terminal 44, through line 62, line 64, brush 65, through the conductive portion of the plate 24, brush 67, line 66, contact 53, arm 56, parallelly connected to buzzer 57 and lamp 18, line 70 and back to terminal 46.

Eight brushes 65, 67, 69, 71, 73, 75, 77 and 79 are associated with the plate 24. The individual contacts on the plate are not illustrated. Brushes 67, 69, 71, 73, 75, 77 and 79 are associated with the rings of contacts 28, 30, 32, 34, 36, 38 and 40, respectively (FIGURE 2). The brush 65 is associated with the common conductive portion 27. As was mentioned the common conductive portion 27 is electrically connected to all the contacts in the rings of contacts since all the rings have solid conductive rings therebetween electrically connecting them back to the portion 27. The brushes must be suitably aligned so that they engage the conductive rings of contacts and not engage the solid conductive portions between the rings.

When the plate 24 is rotated so that a brush engages a contact, the resulting current causes the lamp 18 to flash and the buzzer 57 to produce an audible sound. The flashes and sounds produced will be in accordance with the length of time during which the selected brush is in engagement with the contact of the plate 24. If the contact engaged by the brush is relatively narrow, a short audible signal representing a "dot" will be produced. If the contact engaged is relatively wide, an audible signal representing a "dash" will be produced. When the selected brush is between contacts and in engagement with an insulator portion of the plate 24, the electric circuit will be broken and no sound or light will result in the buzzer 57 and lamp 18, respectively. The contacts of the plate 24 are arranged to produce Morse code characters.

When the arm 48 is moved to the contact designated "key," the current path to the motor 42 is broken. At the same time the key 16 is serially connected to the light and the buzzer to permit manually operation of the device so as to enable a beginner to practice sending. The key 16 acts as a switching device for manual operation in much the same manner as the printed circuit plate acts as a switching device to provide automatic operation.

In one embodiment of the present invention, each group of characters may be included on the same ring of contacts four times, with the order of the letters being different each time. Thus, it is seen that a person learning to receive one group or six characters of the Morse code will hear the same group repeated over and over again four times before the entire cycle is repeated.

Figure 4:
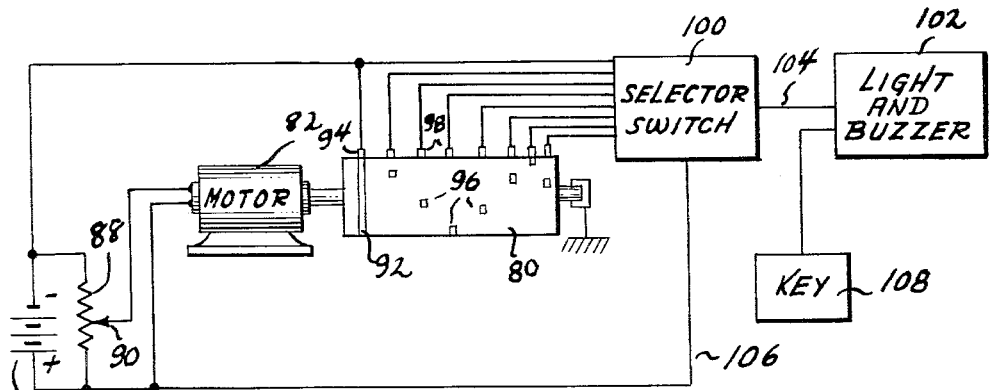
FIGURE 4 is a diagrammatical view, partly in block diagram form, illustrating another embodiment of the present invention.

Referring particularly to FIGURE 4, another embodiment of the present invention includes a drum member 80 which is driven by a direct current motor 82. The motor 82 is driven by a source of direct current power, such as a battery 86. A potentiometer is connected across the battery 86. A movable arm 90 is adapted to be moved whereby a variable voltage may be applied to the motor 82. The variable voltage applied to the motor 82 may be used to control the speed of the motor. Thus the speed of rotation of the drum 82 may be made variable to cause automatic transmission of Morse code signals at variable speeds, as will be seen. The drum 82 may be rotated at relatively slow speeds as the Morse code is being learned by a beginner. The speed of the drum 82 may be increased to increase the speed of transmission as greater proficiency is acquired by a learner of the Morse code.

The basic operation of the device illustrated in FIGURE 4 is substantially the same as the operation of the device described in connection with FIGURE 3, except for the variable speed feature and the direct current operation of the motor 82. Many of the details are omitted for purposes of clarity. For example, only a few of the electrical contacts associated with the drum 80 are illustrated and various other elements of the device are illustrated in the form of blocks.

Power from the battery 86 is applied to the solid contact ring 92 through a brush element 94. The solid ring 92 is electrically connected to various contacts 96. The contacts 96 are associated with various brush elements 98, which, in turn are connected to a selector switch 100. The selector switch 100 is electrically connected to operate a light and buzzer 102 through a line 104. A return line 106 is provided to return the selector switch 100 to the positive terminal of the battery 86.

As has been described in connection with FIGURES 1 and 2, the contacts 96 may be arranged in rings and dimensioned to represent Morse code characters. The position of the selector switch 100 will determine which ring or row of the contacts 96 will actuate the light and buzzer 102. The selector switch 100 may be moved from position to position through seven different rows of contacts until the entire thirty-six Morse code characters are learned by a student.

A key 108 is provided to actuate the light and buzzer 102. This permits a learner to manually send Morse code characters. Thus, again, the embodiment of FIGURE 4 includes a device which provides automatic transmission as well as manual transmission of Morse code characters.

The drum 80 may consist of a metallic drum with a suitable insulated material. Portions of the insulated material may be cut away to expose portions of the metal to the brush members to produce Morse code characters.

The present invention may of course take other forms than those specifically illustrated. The contact bearing element, such as the drum and printed circuit plate, may take other forms. For example the contact bearing elements may be, cam like mechanical elements disposed to close micro-switches to actuate electrical circuits such as a buzzer and light. It is also conceivable that various types of tapes may be employed to produce six groups of Morse code signals, with each group consisting of six Morse code characters. The invention, however, does not embrace the use of tape, such as previously used by the Armed Forces, on which code is recorded and transmitted in random order, where there has been no subdividing of the Morse code into specific groups for teaching purposes.

An audio oscillator or other sound producing device may be substituted for the buzzer. A conventional telegraph key may be provided in place of the built in manual key illustrated.

Various jack connections may be provided in the device illustrated. Such an arrangement, for example, may permit a person to connect two units by means of a cable and thereby provide two way communication. In some cases, it may be desirable to provide a switching arrangement to produce light and no sound, and vice versa.

What is claimed is:

1. A device designed for teaching the Morse code characters including the twenty-six letters of the alphabet and ten numbers comprising a flat printed circuit plate member, including a plurality of concentric rings, each of said rings including a plurality of electrical contacts and a common contact, said electrical contacts being dimensioned and spaced to correspond to dots and dashes of the Morse code and arranged to correspond to individual Morse code characters, said characters being arranged into six different groups with six characters in each group, the electrical contacts associated with each group of characters being disposed on a different ring of said plurality of concentric rings, a plurality of brush elements disposed to engage the contacts of said plurality of rings, a source of power, a buzzer, a selector switch having a plurality of terminals electrically connected to said brush elements, means for connecting said source of power to said common contact through contacts on a selected ring of said plurality of rings to actuate said buzzer, and a keying element for manually actuating said buzzer.

2. A device designed for teaching the Morse code characters including the twenty-six letters of the alphabet and ten numbers comprising a flat printed circuit plate member including a plurality of concentric rings, each of said rings including a plurality of electrical contacts and a common contacts, said electrical contacts being dimensioned and spaced to correspond to dots and dashes of the Morse code and arranged to correspond to individual Morse code characters, said characters being arranged into six different groups with six characters in each group, the electrical contacts associated with each group of characters being disposed on a different ring of said plurality of concentric rings, a plurality of brush elements disposed to engage the contacts of said plurality of rings, a source of power, a buzzer, and electrical visual indicator connected in parallel with said buzzer, a selector switch having a plurality of terminals electrically connected to said brush elements, means for connecting said source of power to said common contact through contacts on a selected ring of said plurality of rings to actuate said buzzer and visual indicator device, and a keying element for manually actuating said buzzer and visual indicator.

3. The invention as set forth in claim 2 wherein said device is completely self contained within a single housing.

4. The invention as set forth in claim 2 wherein said printed circuit member is rotated at a variable speed.

5. The invention as set forth in claim 2 wherein said source of power is a battery.

References Cited by the Examiner
UNITED STATES PATENTS

| 1,474,534 | 11/1923 | Lindsten | 35—14 |
| 2,660,720 | 11/1953 | Dehmel | 35—14 X |
| 2,947,090 | 8/1960 | Levin | 35—14 |

FOREIGN PATENTS 30,044  8/1910  Great Britain.

EUGENE R. CAPOZIO, *Primary Examiner.*

LEO SMILOW, GEORGE A. NINAS, JR., JEROME SCHNALL, *Examiners.*